United States Patent

Ohba et al.

[11] Patent Number: 6,067,200
[45] Date of Patent: May 23, 2000

[54] METHOD AND APPARATUS FOR ADJUSTING A BIAS CURRENT OF A MAGNETO-RESISTIVE EFFECT TYPE MAGNETIC HEAD AND MAGNETIC RECORDING APPARATUS

[75] Inventors: Kazuhide Ohba, Yamagata; Kensuke Miyagawa, Kanagawa; Hajime Miura, Kanagawa; Hideki Ohmori, Kanagawa, all of Japan

[73] Assignee: Fujitsu Limited, Kawasaki, Japan

[21] Appl. No.: 08/893,313

[22] Filed: Jul. 16, 1997

[30] Foreign Application Priority Data

Sep. 30, 1996 [JP] Japan .................................. 8-259888

[51] Int. Cl.⁷ .................................................... G11B 5/03
[52] U.S. Cl. ................................................................ 360/66
[58] Field of Search ............................... 360/66, 67, 113, 360/46

[56] References Cited

U.S. PATENT DOCUMENTS 5,774,291  6/1998  Contreras ..................................... 360/66
5,790,334  8/1998  Cunningham ............................... 360/66
5,825,570 10/1998  Kanegae et al. ........................... 360/65

FOREIGN PATENT DOCUMENTS 60-229204 11/1985 Japan .
4-205903   7/1992 Japan .
5-325110  12/1993 Japan .
5-334607  12/1993 Japan .

*Primary Examiner*—Andrew L. Sniezek
*Assistant Examiner*—Regina Y. Neal
*Attorney, Agent, or Firm*—Greer, Burns & Crain, Ltd.

[57] ABSTRACT

A method is provided to adjust a bias current flowing through a magneto-resistive effect type magnetic head. An examining current is supplied to the magneto-resistive effect type magnetic head, and a voltage applied to a pair of terminals of the magneto-resistive effect type magnetic head is measured. In addition, a resistance of the magneto-resistive effect type magnetic head is calculated according to the examining current and the voltage, and an allowable range of the bias current flowing through the magneto-resistive effect type magnetic head is determined according to a relationship between a life time of the magneto-resistive effect type magnetic head examined in advance and the resistance of the magneto-resistive effect type magnetic head. An optimum bias current is determined within the allowable range in condition that a slice level margin is maximized.

9 Claims, 14 Drawing Sheets

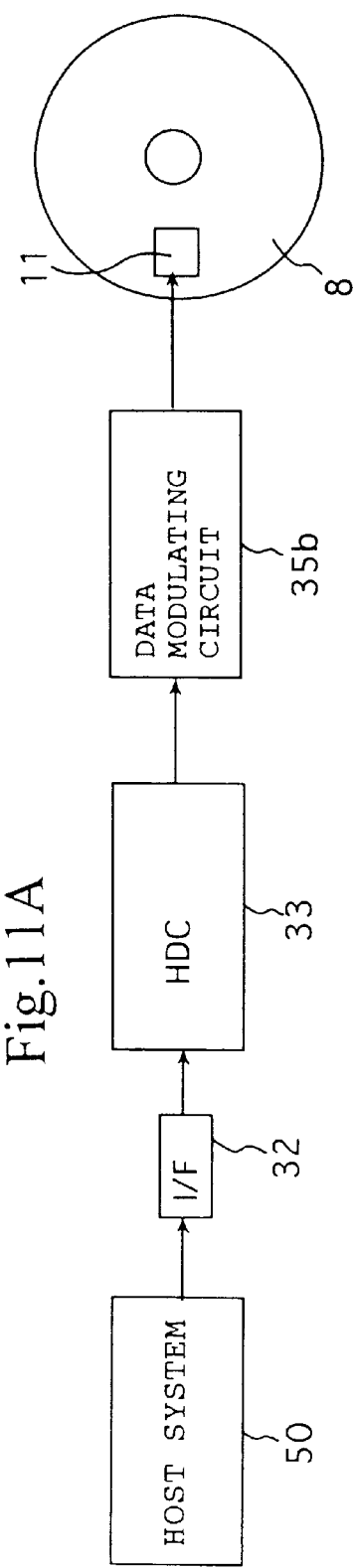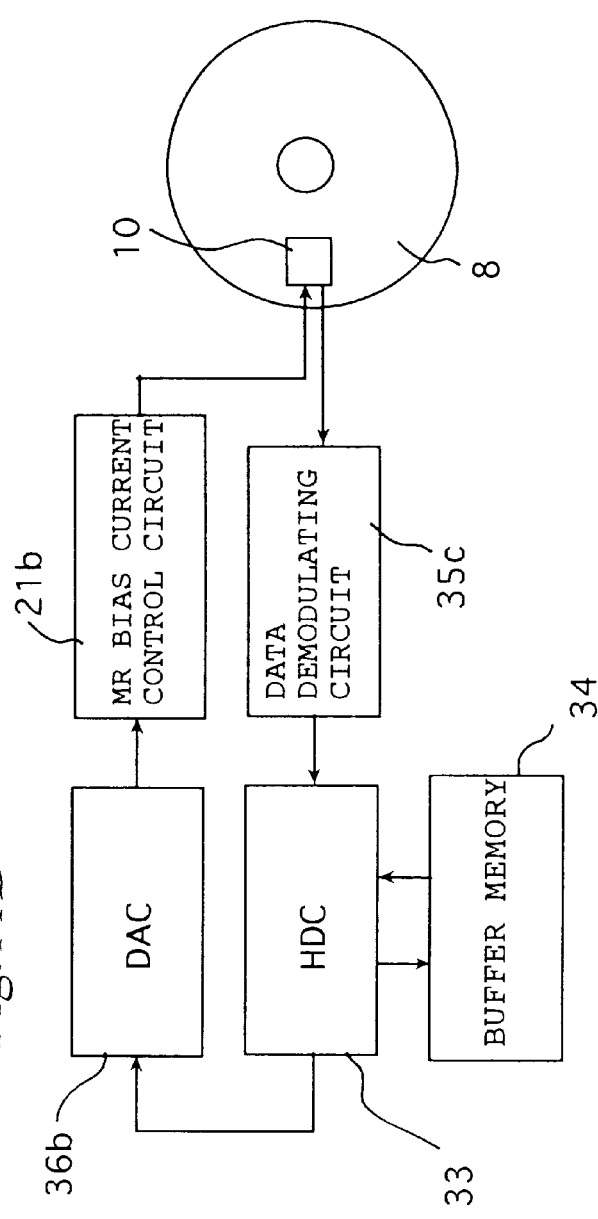
Fig.11A
Fig.11B

METHOD AND APPARATUS FOR ADJUSTING A BIAS CURRENT OF A MAGNETO-RESISTIVE EFFECT TYPE MAGNETIC HEAD AND MAGNETIC RECORDING APPARATUS

BACKGROUND OF THE INVENTION

1. Field of the Invention

The present invention relates to method and apparatus for adjusting a bias current flowing through a magneto-resistive effect type magnetic head to an optimum value and a magnetic recording apparatus having the magneto-resistive effect type magnetic head.

2. Description of the Prior Art

As a reproducing head for a magnetic disk apparatus in which a large volume of high density information is processed, a magnetic head having a magneto-resistive effect device in which an electric resistance changes with a strength of a magnetic field has been used. As shown in FIG. 14(A), for example, a magneto-resistive effect type magnetic head (hereinafter, called an MR head) has a structure in which a soft magnetic layer 101, a non-magnetic layer 102 and a magneto-resistive effect layer 103 are arranged in that order to be piled up, a pair of magnetic domain control magnetic layers 106 and 107 are arranged on both sides of the magneto-resistive effect layer 103 and a pair of leads 104 and 105 are arranged on the magnetic domain control magnetic layers 106 and 107. In the above structure, a bias current Is flows through a sense region W of the magneto-resistive effect layer 103 through the leads 104 and 105, a direction of a magnetization M of the sense region W changes with an external magnetic field, and a resistance of the sense region W is changed. A change of the resistance is detected as a change in voltage. As resistance of the magneto-resistive effect layer 103 becomes large, a reproducing output of the MR head becomes larger. In contrast, a sensitivity of the MR head is lowered as the resistance of the magneto-resistive effect layer 103 becomes large.

Therefore, appropriate adjustment resistance in the MR head is required. As one method for respectively adjusting the resistance in the MR head, there is a method for changing a resistance between the leads 104 and 105 by polishing portions of the soft magnetic layer 101, the non-magnetic layer 102 and the magneto-resistive effect layer 103 opposite to a magnetic recording medium. This polishing is performed for planes of the soft magnetic layer 101, the non-magnetic layer 102 and the magneto-resistive effect layer 103 opposite to the magnetic recording medium, and a resistance of each of the layers 101 to 103 becomes larger as a height of each of the layers 101 to 103 becomes low. In this case, the height each of the layers 101 to 103 is defined as a height in a direction perpendicular to an upper surface of the magnetic recording medium.

However, it is troublesome that the resistance in the MR head is adjusted by polishing the layers 101 to 103, and there is a problem that the resistance cannot be adjusted with a high accuracy.

Also, there is another problem that a life time of the MR head is shortened because of the occurrence of migration in the MR head. The migration is a phenomenon that the magneto-resistive effect layer 103 or the like is melt and cut out by the bias current.

Because the uneven polishing of the layers 101 to 103 is inevitably performed and the migration inevitably occurs, the optimization of a current (or the bias current) flowing though the MR head is performed. To optimize the bias current, as shown in FIG. 14(B), a curved line of the life time is initially determined in rectangular co-ordinates expressing the relationship of the resistance in the MR head (called an MR resistance) and the MR bias current. The curved line of the life time is obtained according to experimental results.

When the bias current is determined according to the curved line of the life time, an upper limit is set for the MR resistance, and the bias current is determined on condition that an MR head in which the MR resistance exceeds the upper limit is not used. Thereafter, a maximum bias current $J_0$ which is allowable for an MR head in which the MR resistance is equal to the upper limit is determined as a bias current set for all MR heads.

Other methods for respectively determining the bias current are described as follows.

As shown in FIG. 15, a bias current Is flowing through the MR head is fixed to a prescribed value, and a relationship between a height H of the MR head and the life time is examined while changing the height H of the MR head. Thereafter, an MR head having a height H at which the life time of the MR head is longer than a desired life time is selectively used.

Also, as shown in FIG. 16, a bias current Is flowing through the MR head is fixed to a prescribed value, and a relationship between a height H of the MR head and an amplitude Viso of an output voltage waveform is examined while changing the height H of the MR head. Thereafter, an MR head having a height H at which the amplitude Viso of the output voltage waveform is longer than a desired amplitude is selectively used.

However, even though the bias current Is is determined according to one of the methods, a value of the bias current Is flowing though a particular MR head in which the MR resistance is low becomes too low, so that a high output cannot be obtained in the particular MR head. Also, because it is required to determine an upper limit of the MR resistance when the bias current Is is determined according to one of the methods, any MR head in which the MR resistance is higher than the upper limit cannot be used, so that many MR heads are uselessly manufactured in a large scale manufacturing.

SUMMARY OF THE INVENTION

An object of the present invention is to provide, with due consideration to the drawbacks of such conventional method and apparatus for adjusting a bias current of a magneto-resistive effect type magnetic head, method and apparatus for adjusting a bias current of a magneto-resistive effect type magnetic head and a magnetic recording apparatus having the magneto-resistive effect type magnetic head in which the bias current is adjusted according to the method.

In the present invention, an allowable range of a bias current flowing though an MR head is determined according to a relationship between a resistance of the MR head and a life time of the MR head, and an optimum bias current is set within the allowable range. Therefore, an output of an MR head in which the MR resistance is low can be enlarged.

Also, in cases where a particular bias current at which a slice level margin is maximized is set as an optimum bias current within the allowable range, the ability of the MR head can be sufficiently used, and the degradation of the MR head caused by the migration can be prevented.

Also, in cases where the bias currents flowing through all MR heads are the same value, even though a particular MR head is not used for a magnetic recording apparatus in the prior art because the MR resistance of the particular MR head is too high, because the optimum bias current flows though the particular MR head, a number of MR heads manufactured in a large scale manufacturing can be efficiently used for a number of magnetic recording apparatuses.

BRIEF DESCRIPTION OF THE DRAWINGS

FIG. 11(A) is a block diagram of a circuit system used to record data of the optimum bias current in a magnetic disk in the magnetic disk apparatus according to the embodiment of the present invention.

FIG. 11(B) is a block diagram of a circuit system used to read out the data of the optimum bias current recorded in the magnetic disk and make the optimum bias current flow through the MR head in the magnetic disk apparatus according to the embodiment of the present invention.

DESCRIPTION OF THE PREFERRED EMBODIMENTS

Preferred embodiments of the method and apparatus for adjusting a bias current of a magneto-resistive effect type magnetic head and a magnetic recording apparatus having the magneto-resistive effect type magnetic head according to the present invention are described with reference to the drawings.

Figure 1:
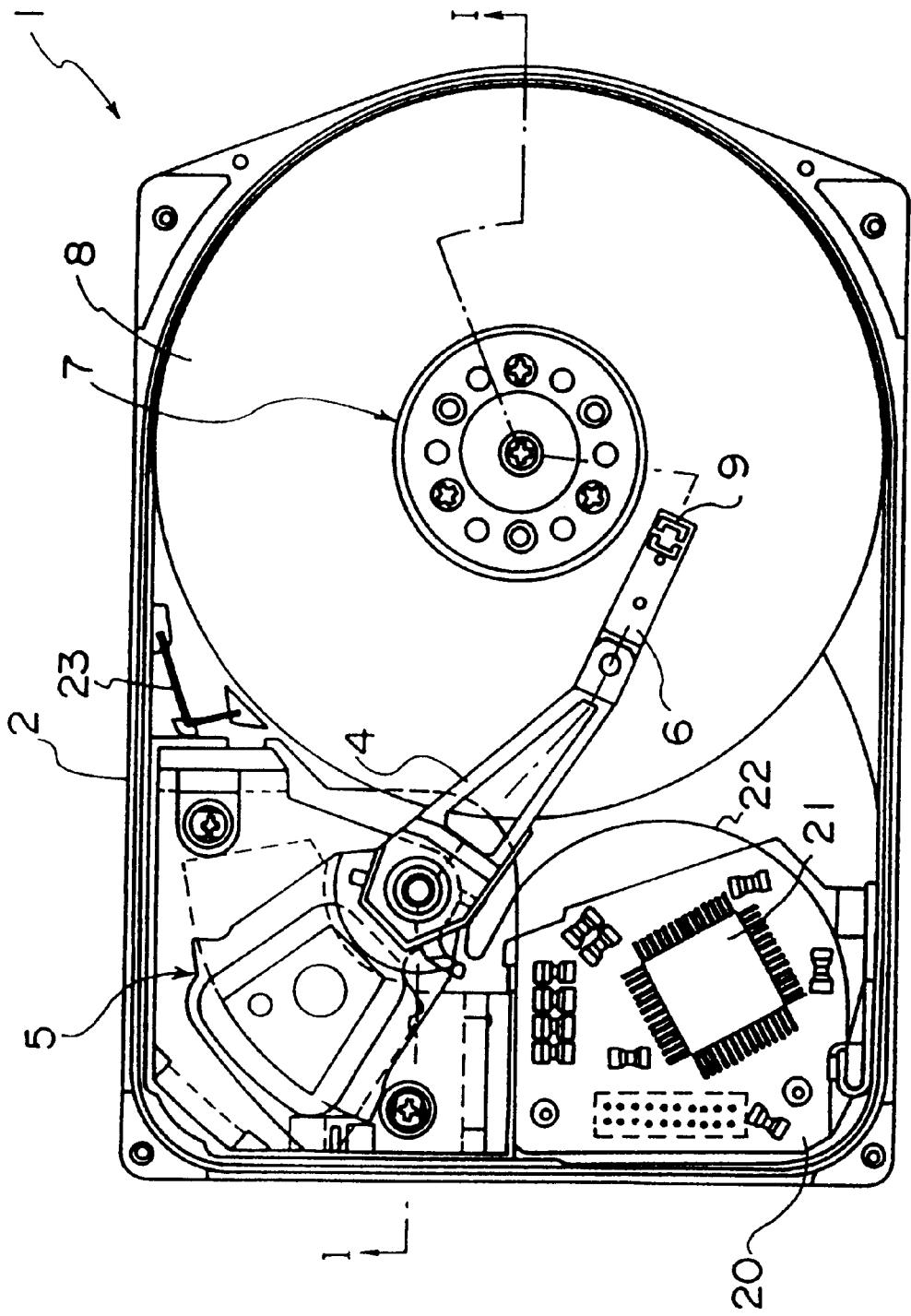
FIG. 1 is a plan view of internal structure of the magnetic disk apparatus according to an embodiment of the present invention.

An internal structure of a magnetic disk apparatus of the present invention is initially described. FIG. 1 is a plan view of the internal structure of the magnetic disk apparatus, and FIG. 2 is a cross sectional view taken generally along an I—I line of FIG. 1.

Figure 2:
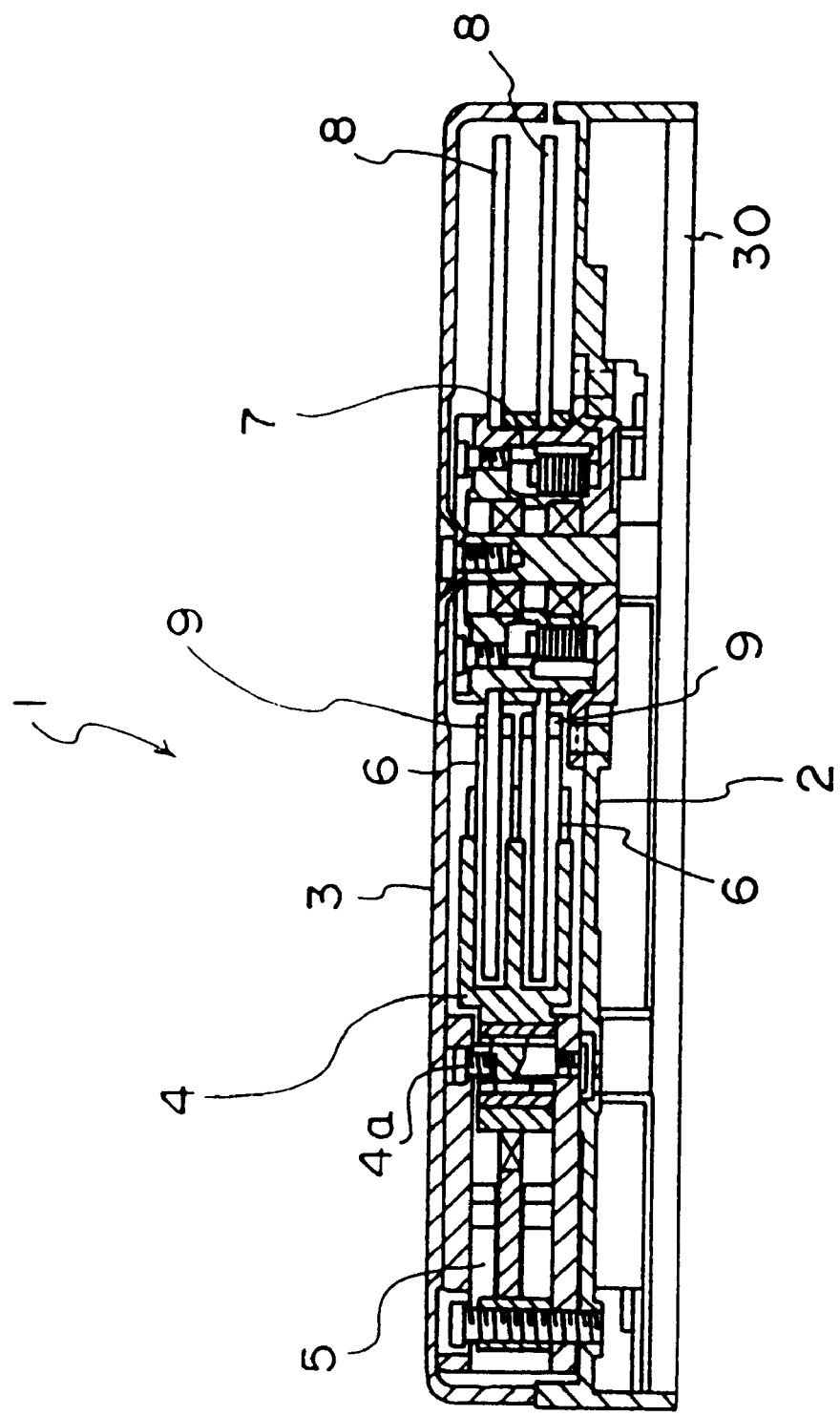
FIG. 2 is a cross sectional view of the internal structure of the magnetic disk apparatus shown in FIG. 1.

As shown in FIGS. 1 and 2, a box type case of a magnetic disk apparatus 1 comprises a base plate 2 and a cover 3. In a region near to one corner of the box type case, an actuator 4 is rotatably supported in a lateral direction by an axis 4a. On a rear side of the axis 4a of the actuator 4, a voice coil motor 5 is attached to the axis 4a, and a plurality of arms 6 are attached to the axis 4a of the actuator 4 on a front side of the actuator 4.

Also, a spindle motor 7 is arranged in an almost central region of the base plate 1. A rotational axis of the spindle motor 7 penetrates through a plurality of central holes of a plurality of disk shaped magnetic recording mediums (hereinafter, respectively called a magnetic disk). The magnetic disks 8 are fixedly arranged in parallel to each other in a thickness direction at prescribed intervals.

Figure 3A:
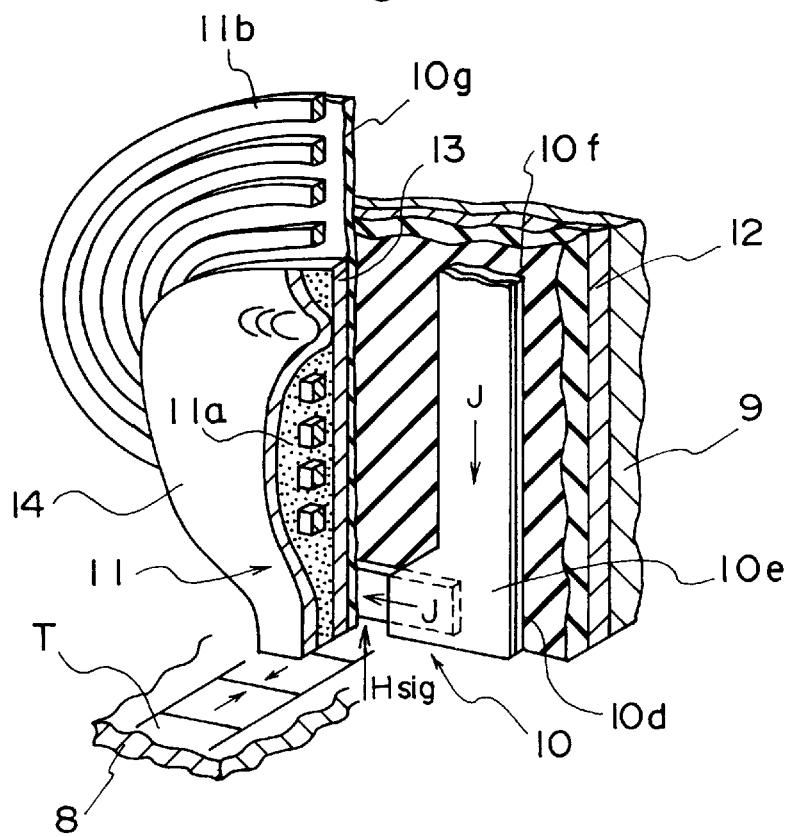
FIG. 3(A) is a diagonal cross sectional view showing a structure of an MR head and a structure of an induction type head applied for the magnetic disk apparatus according to the embodiment of the present invention.

When the number of magnetic disks 8 is N (N is a natural number), the number of data planes is 2N, so that the number of arms 6 attached to the actuator 4 is 2N. Each of the arms 6 is arranged to be opposite to one data plane of one magnetic disk 8. Also, as shown in FIG. 3(A), a slider 9 having both an MR head 10 as a reproducing head and an induction type head 11 as a recording head is attached to a portion of each arm 6 placed in the neighborhood of a top end of each arm 6.

Figure 3B:
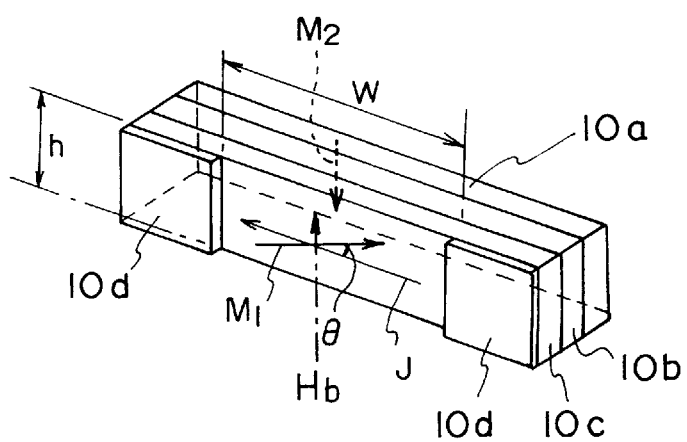
FIG. 3(B) is a diagonal view showing a sense region of the MR head and a structure of layers placed in the neighborhood of the sense region.

As shown in FIG. 3(B), the MR head 10 comprises an SAL layer 10a made of NiFeRh or NiFeCr, a non-magnetic layer 10b made of Cu and a magneto-resistive effect layer 10c made of NiFe. The SAL layer 10a, the non-magnetic layer 10b and the magneto-resistive effect layer 10c are formed in the same rectangular shape and are piled up in that order, and a pair of magnetic domain control magnetic layers 10d respectively made of a hard magnetic material such as CoCrPt or an antiferro-magnetic material such as FeMn are arranged on both sides of the magneto-resistive effect layer 10c. A magnetization easy axis of the magneto-resistive effect layer 10c is controlled to be directed in a direction in which a sense current J flows. Also, a pair of leads 10e made of gold are arranged on the magnetic domain control magnetic layers 10d, and the sense current J flows between the leads 10e.

In the SAL layer 10a, a direction of a magnetization M2 is controlled by a magnetic field which is induced by the sense current J flowing between the leads 10e, and the direction of the magnetization M2 is perpendicular to a flowing direction of the sense current J. In addition, a direction of a magnetization M1 of the magneto-resistive effect layer 10c is influenced by a bias magnetic field Hb induced by the magnetization M2 of the SAL layer 10a and is inclined by an angle θ with respect to the magnetization easy axis. Therefore, a resistance of the magneto-resistive effect layer 10c linearly changes with a signal magnetic field Hsig.

The SAL layer 10a, the non-magnetic layer 10b, the magneto-resistive effect layer 10c, the magnetic domain control magnetic layers 10d and the leads 10e are arranged between a first non-magnetic insulating layer 10f and a second non-magnetic insulating layer 10g, and the first and second non-magnetic insulating layers 10f and 10g are arranged between a first magnetic shield layer 12 and a second magnetic shield layer 13.

Figure 4:
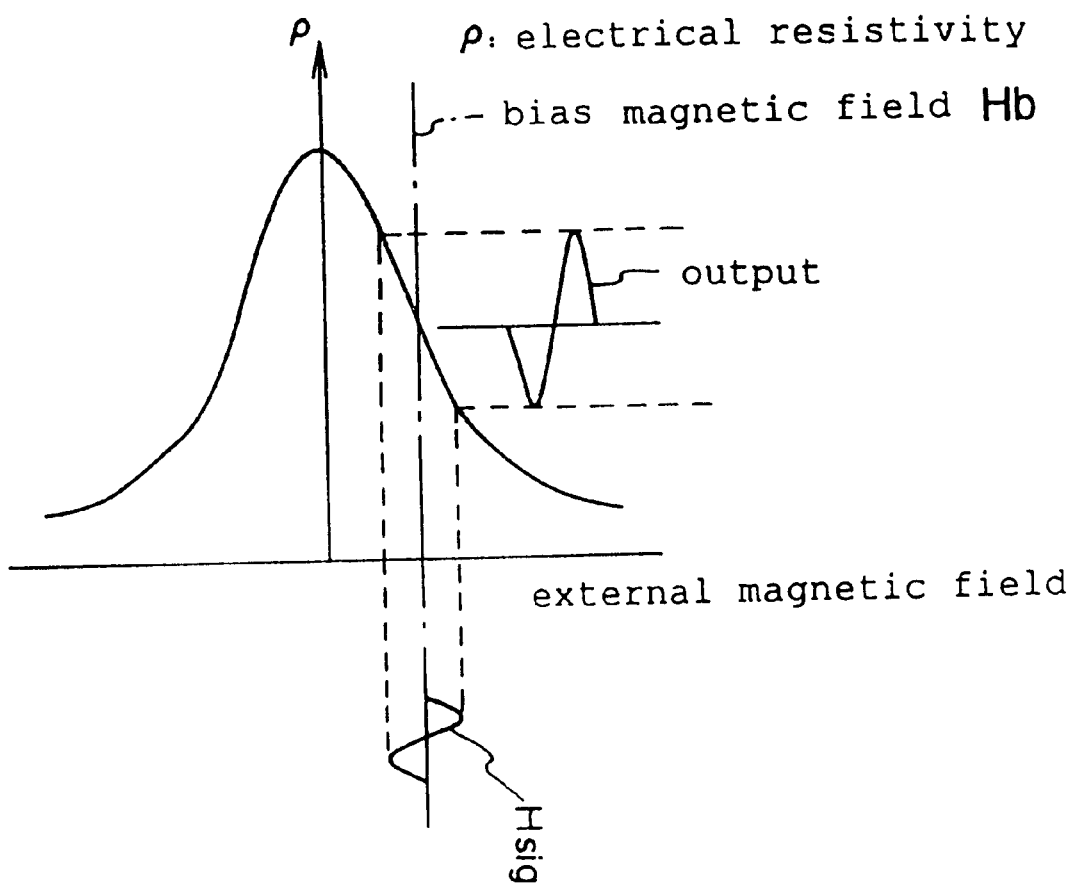
FIG. 4 shows a relationship between an electrical resistivity of the MR head of the magnetic disk apparatus according to the embodiment of the present invention and an external magnetic field.

In the magneto-resistive effect layer 10c, an electrical resistivity of the magneto-resistive effect layer 10c changes with a magnetic field induced in the magneto-resistive effect layer 10c according to a non-linearrelationship between the electrical resistivity and the magnetic field shown in FIG. 4. However, when the bias magnetic field Hb is added to the magnetic field induced in the magneto-resistive effect layer 10c, the electrical resistivity of the magneto-resistive effect layer 10c linearly changes with the signal magnetic field Hsig. In this case, because the bias magnetic field Hb is induced by the magnetization M2 of the SAL layer 10a, the bias magnetic field Hb changes with the sense current J.

Also, the induction type head 11 comprises an insulating layer 11a arranged between the second magnetic shield layer 13 and a third magnetic shield layer 14 and an induction coil 11b buried with the insulating layer 11a. A top end of the third magnetic shield layer 14 is thinned and functions as a core in which a magnetic field is induced to record data in the magnetic disk 8. Also, a recording gap is formed between the second magnetic shield layer 13 and the third magnetic shield layer 14.

Also, as shown in FIG. 1, a flexible print circuit substrate (hereinafter, called an FPC substrate) 20, in which a head semiconductor integrated circuit (hereinafter, called a head IC) 21 is arranged, is placed in another corner region of the box type case to be adjacent to the actuator 4 to which the MR head 10, the induction type head 11 and the arm 6 are attached. Also, a flexible band 22 is extended from the FPC substrate 20 to a side portion of the actuator 4, and a patterned wire (not shown) formed on the flexible band 22 is connected with both a wire extended from the induction coil 11b of the induction type head 11 and the lead 10e of the MR head 10. Therefore, the head IC 21 is electrically connected with the reproducing head 10 to electrically connect the head IC 21 with the induction type head 11. The head IC 21 comprises a writing circuit used to write data in the magnetic disk 8, a reading circuit used to read out data and servo information from the magnetic disk 8 and a selection circuit used to select one of the MR heads.

Also, a dust protective filter 23 is arranged in the neighborhood of the magnetic disks 8, so that dust included in an air, which flows in the box of the magnetic disk apparatus 1 when one magnetic disk 8 is rotated, is adsorbed in the dust protective filter 23.

Figure 5:
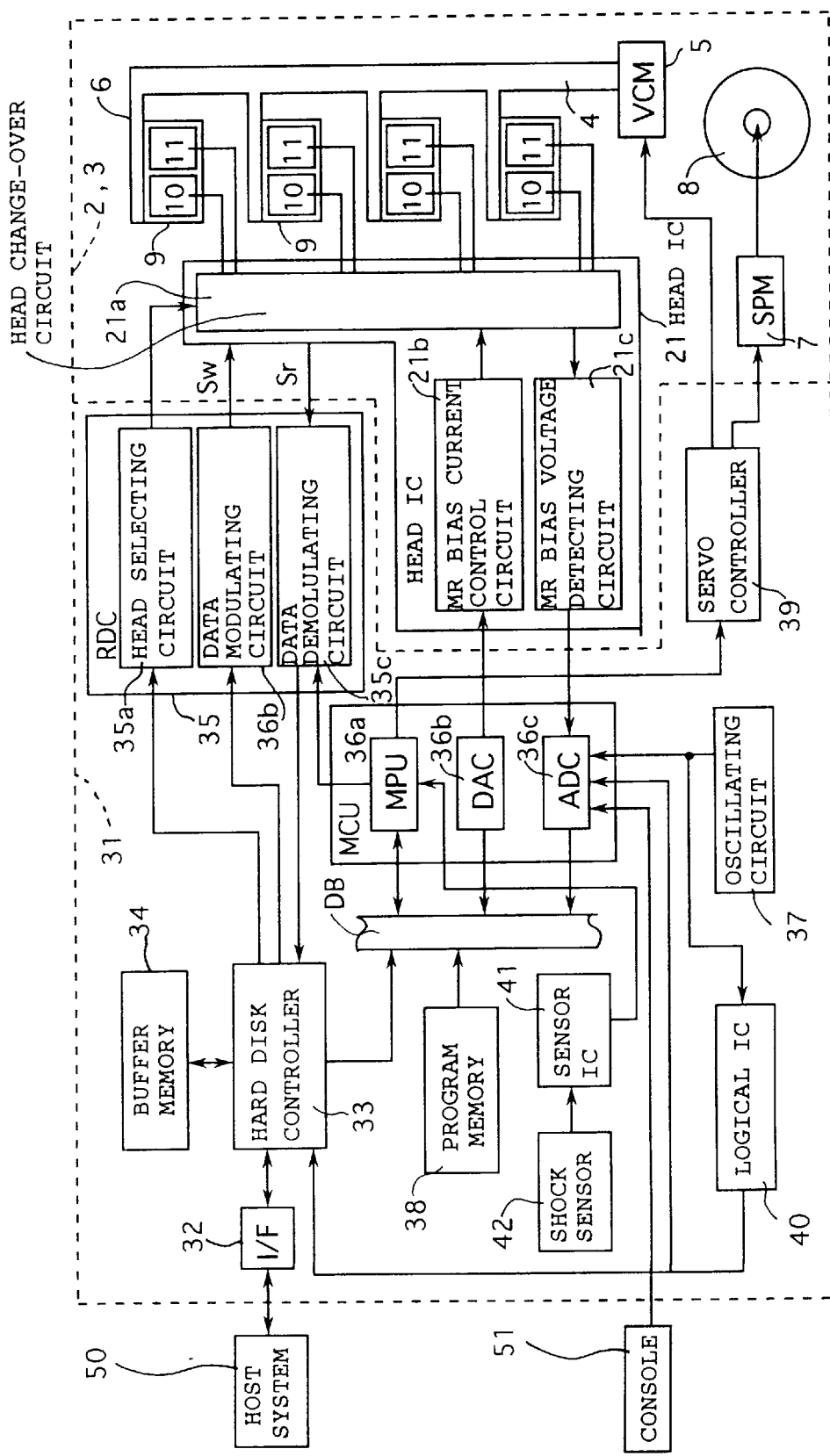
FIG. 5 is a block diagram of a circuit of the magnetic disk apparatus according to the embodiment of the present invention.

Also, as shown in FIG. 2, a print substrate 30 is arranged under the base plate 2 of the magnetic disk apparatus 1. The print substrate 30 has a control unit 31 shown in FIG. 5, and the control unit 31 is connected with the head IC 21, the voice coil motor 5 and the spindle motor 7. As shown in FIG. 5, the control unit 31 comprises an interface (I/F) 32, a hard disk controller 33, a buffer memory 34, a lead channel 35, a micro-controller unit 36, an oscillating circuit 37, a program memory 38, a servo controller 39, a logical integrated circuit 40, a shock sensor semiconductor integrated circuit (or an sensor IC) 41 and a shock sensor 42. The buffer memory 34 is formed of a semiconductor recording device such as a dynamic random access memory (DRAM).

Various commands and data required for the input/output operation are transferred between a host system 50 placed outside the magnetic disk apparatus 1 and the control unit 31 through the interface 32, and the transfer operation of the commands and data is controlled by the hard disk controller 33. The data transferred to the hard disk controller 33 is temporarily stored in the buffer memory 34 connected with the hard disk controller 33 and is transferred to the micro-controller unit 36 through a data bus DB.

The micro-controller unit 36 comprises a micro-processor unit (MPU) 36a, a digital analog converting circuit (DAC) 36b, an analog digital converting circuit (ADC) 36c, a RAM (not shown) and a read only memory (ROM) (not shown). A clock signal transmitted from the oscillating circuit 37 or the logical integrated circuit 40 and a signal transmitted from the shock sensor semiconductor integrated circuit 41 are input to the micro-controller unit 36.

In the digital analog converting circuit 36b, sense current setting digital data input from the hard disk controller 33 through the micro-processor unit 36a is converted into an analog voltage, and the analog voltage is output to an MR bias current control circuit 21b of the head integrated circuit 21. In the MR bias current control circuit 21b, an MR bias current J, of which a value is proportional to a value of the analog voltage output from the digital analog converting circuit 36b, is supplied to the MR head 10.

Also, in the analog digital converting circuit 36c, an MR head voltage analog signal output from an MR bias voltage detecting circuit 21c of the head integrated circuit 21 is converted into an MR head voltage digital signal. Thereafter, the MR head voltage digital signal output from the analog digital converting circuit 36c is input to the host system 50 through the data bus DB, the hard disk controller 33 and the interface 32.

In the logical integrated circuit 40, a second clock signal required for various controls is generated according to a first clock signal output from the oscillating circuit 37. The second clock signal is also output to the hard disk controller 33. Also, in the shock sensor semiconductor integrated circuit 41, a shock detecting signal output from the shock sensor 42 in which a shock is received is output to the micro-processor unit 36a when a level of the shock detecting signal exceeds a prescribed value. Thereafter, in cases where a writing operation is performed in the lead channel 35 when the shock detecting signal is received in the micro-processor unit 36a, a signal instructing a forced termination of the writing operation is output from the micro-processor unit 36a to the lead channel 35.

The lead channel 35 comprises a head selecting circuit 35a for selecting one MR head 10 or one induction type head 11 according to an instruction output from the hard disk controller 33, a data modulating circuit 35b for modulating a recording signal Sw and outputting the recording signal Sw to the head integrated circuit 21 according to a signal output from the hard disk controller 33, and a data demodulating circuit 35c for demodulating a reproducing signal Sr input from the head integrated circuit 21.

In the data demodulating circuit 35c, a partial response class 4 maximum likelihood (PR4ML) method, which is a voltage level detecting method is adopted.

The PR4ML (class 4 of partial response maximum likelihood) is a method of detecting the data from the reproducing voltage wave form.

In the data modulating circuit 35b, a data modulation corresponding to the PR4ML method performed in the data demodulating circuit 35c is performed to obtain a demodulated recording signal Sw, and a magnetic field is induced in one induction type head 11 according to the demodulated recording signal Sw. Therefore, the data is magnetically recorded in a data plane of one magnetic disk 8.

In this embodiment, the PR4ML method is adopted in the data modulating circuit 35b and the data demodulating circuit 35c to detect a voltage level. However, a conventional output waveform peak detecting method can be used in place of the PR4ML method.

In a head change-over circuit 21a of the head integrated circuit 21, one head 10 or 11 connected with the control unit 31 is changed over to one MR head 10 or one induction type head 11 selected by the head selecting circuit 35a according to an instruction signal of the head selecting circuit 35a. Also, in cases where one MR head 10 is selected by the head selecting circuit 35a, the selected MR head 10 is connected with an output terminal of the MR bias current control circuit 21b and an input terminal of the data demodulating circuit 35c through the head change-over circuit 21a. Also, in cases where one induction type head 11 is selected by the head selecting circuit 35a, the selected induction type head 11 is connected with an input terminal of the data modulating circuit 35b through the head change-over circuit 21a. The head integrated circuit 21 has a circuit for reading out servo information, in addition to the head selecting circuit 35a and the data modulating circuit 35b.

In the program memory 38, a boot program used for a start-up of the control unit 31 when an operation of the magnetic disk apparatus 1 is started is stored. In the boot program, data used to supply a start-up bias current denoting a default (or examining) current to all MR heads 10 in a start-up operation exists. Various data are transmitted between the program memory 38 and the hard disk controller 33 or the micro-controller unit 36.

In a start-up operation for the magnetic disks 8 performed while using the boot program, control program data recorded in the magnetic disks 8 is read out through the MR heads 10 and is stored in the buffer memory 34. Because optimum bias current data is written in the control program data for each of the MR heads 10, an optimum bias current is supplied to each of the MR heads 10 according to the optimum bias current data after the start-up operation for the magnetic disk apparatus 1 is finished. In this case, a control signal is output from the micro-processor unit 36a of the micro-controller unit 36 to the servo controller 39, and the voice coil motor 5 and the spindle motor 7 are operated under the control of the servo controller 39.

In the MR bias voltage detecting circuit 21c of the head integrated circuit 21, a voltage applied between one pair of leads 10e of one MR head 10 to which a prescribed bias current is supplied is detected. Data of the detected voltage is converted into a digital signal in the analog digital converting circuit 36c and is output to the host system 50 through the data bus DB, the hard disk controller 33 and the interface 32.

Figure 6:
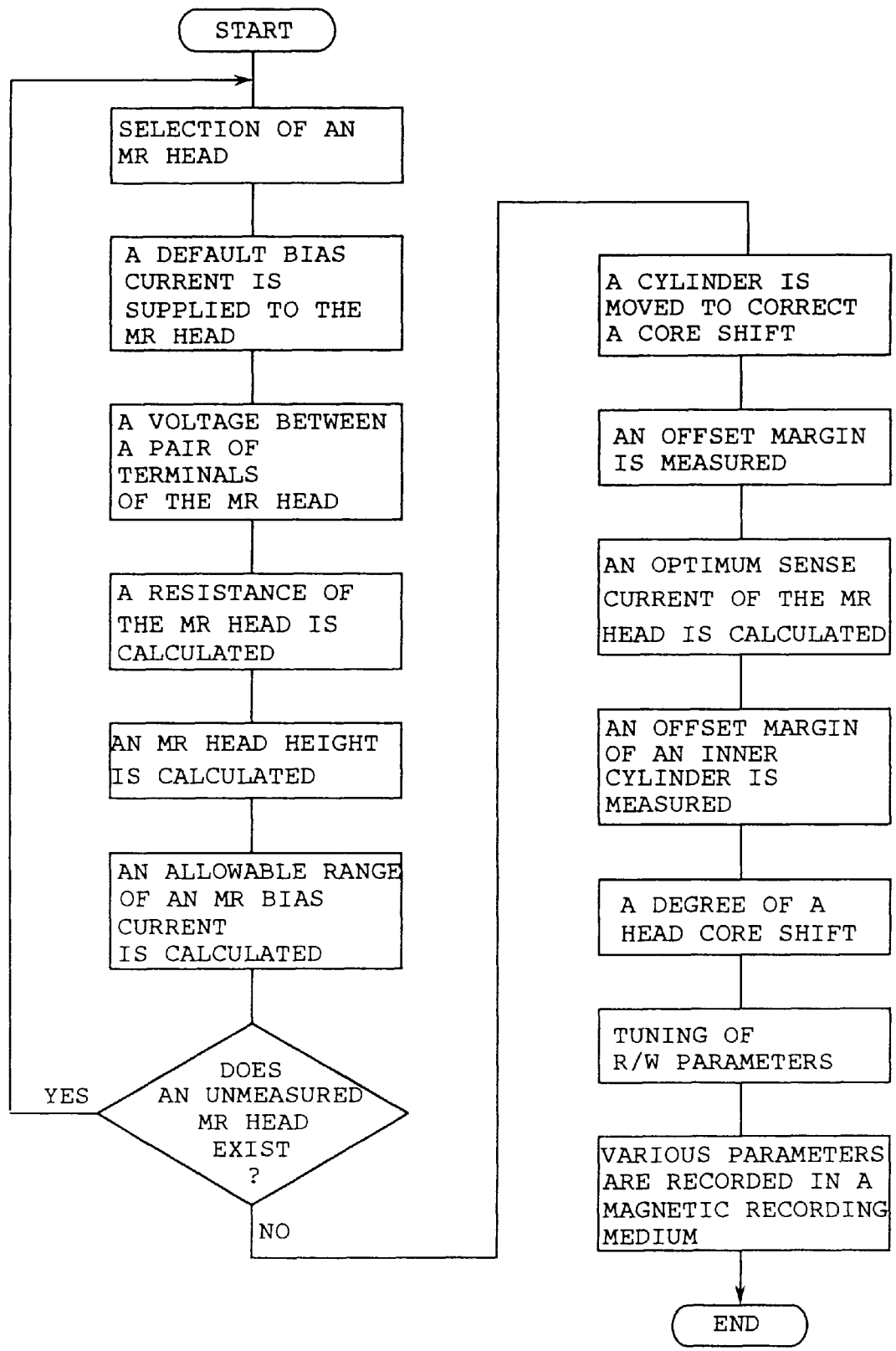
FIG. 6 is a flow chart showing a method for adjusting a bias current to determine an optimum bias current flowing through the MR head of the magnetic disk apparatus according to the embodiment of the present invention.

In the above configuration of the magnetic disk apparatus 1, a method for adjusting a bias current supplied to each of the MR heads 10 to an optimum value is described by using a flow chart shown in FIG. 6.

An optimum value of the bias current is determined in a drive parameter setting step performed in a magnetic disk apparatus manufacturing process.

Figure 7:
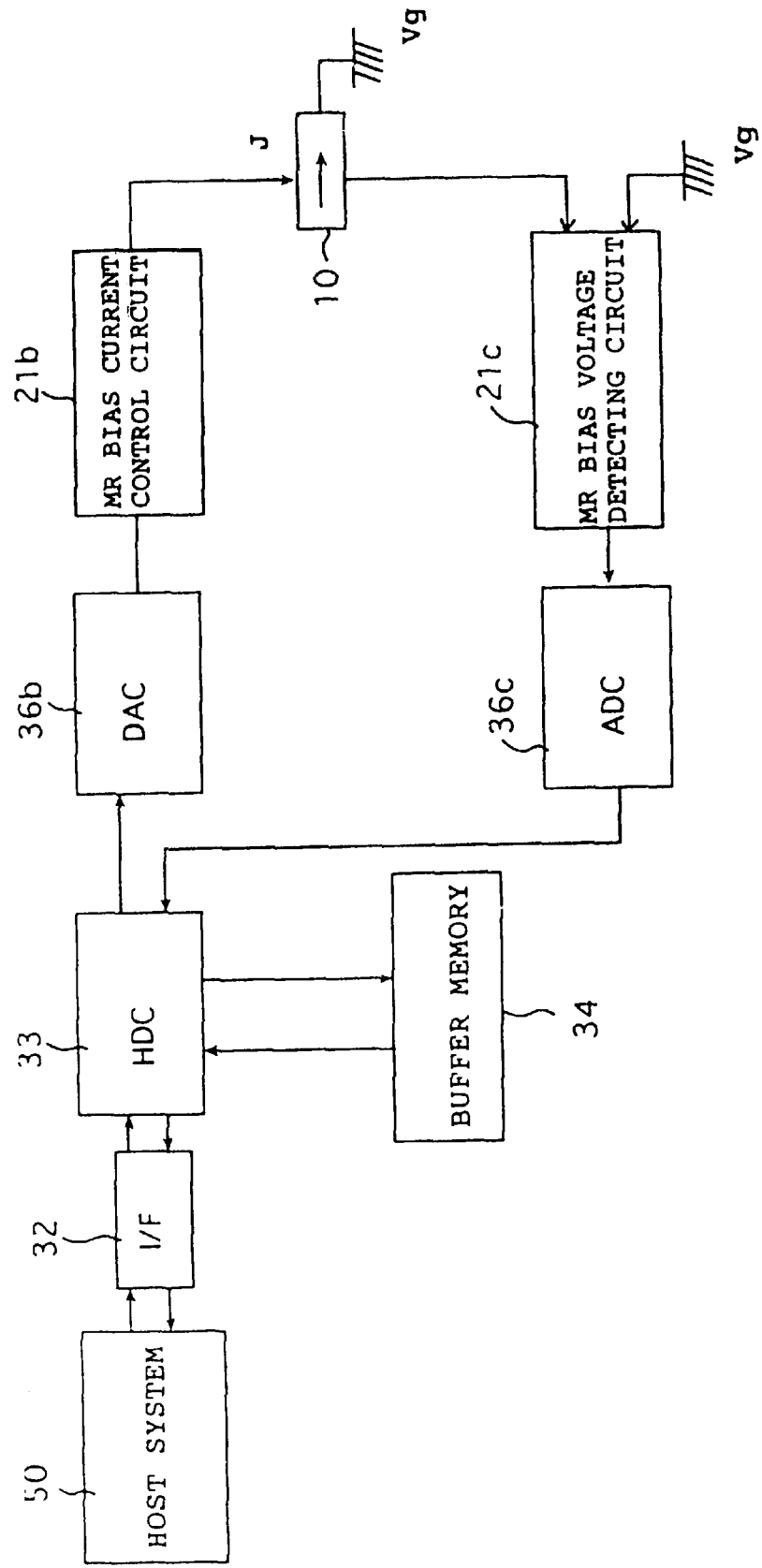
FIG. 7 is a block diagram of a circuit system used to measure a resistance of the MR head of the magnetic disk apparatus according to the embodiment of the present invention.

As shown in FIG. 7, an instruction is transmitted from the host system 50 arranged in a magnetic disk apparatus manufacturing factory to the hard disk controller 33 through the interface 32 to supply a bias current J1 to each of the MR heads 10 for the purpose of measuring a resistance of each MR head 10. When the instruction is received in the hard disk controller 33, a resistance measuring current supply instructing signal is output from the hard disk controller 33 to the MR bias current control circuit 21b through the analog digital converting circuit 36c. Thereafter, the MR heads 10 receive the bias current J1 one after another in the order predetermined in the program under the control of the MR bias current control circuit 21b. The selection of each MR head 10 is performed by the head selecting circuit 35a and the head change-over circuit 21a. Therefore, a voltage V1 obtained by multiplying a MR head resistance R1 and the bias current J1 together is applied between both ends of each MR head 10 in which the bias current J1 flows. Each voltage V1 is detected by the MR bias voltage detecting circuit 21c as a resistance measuring voltage V1 and is output to the buffer memory 34 through the data bus DB and the hard disk controller 33. Each resistance measuring voltage V1 is made a connection with one MR head 10 and is stored in the buffer memory 34. Thereafter, the resistance measuring voltages V1 stored in the buffer memory 34 are transmitted to the host system 50 through the data bus DB and the hard disk controller 33. Here, the voltage V1 is defined as an electric potential difference from a reference voltage (for example, a ground voltage) Vg.

Figure 8:
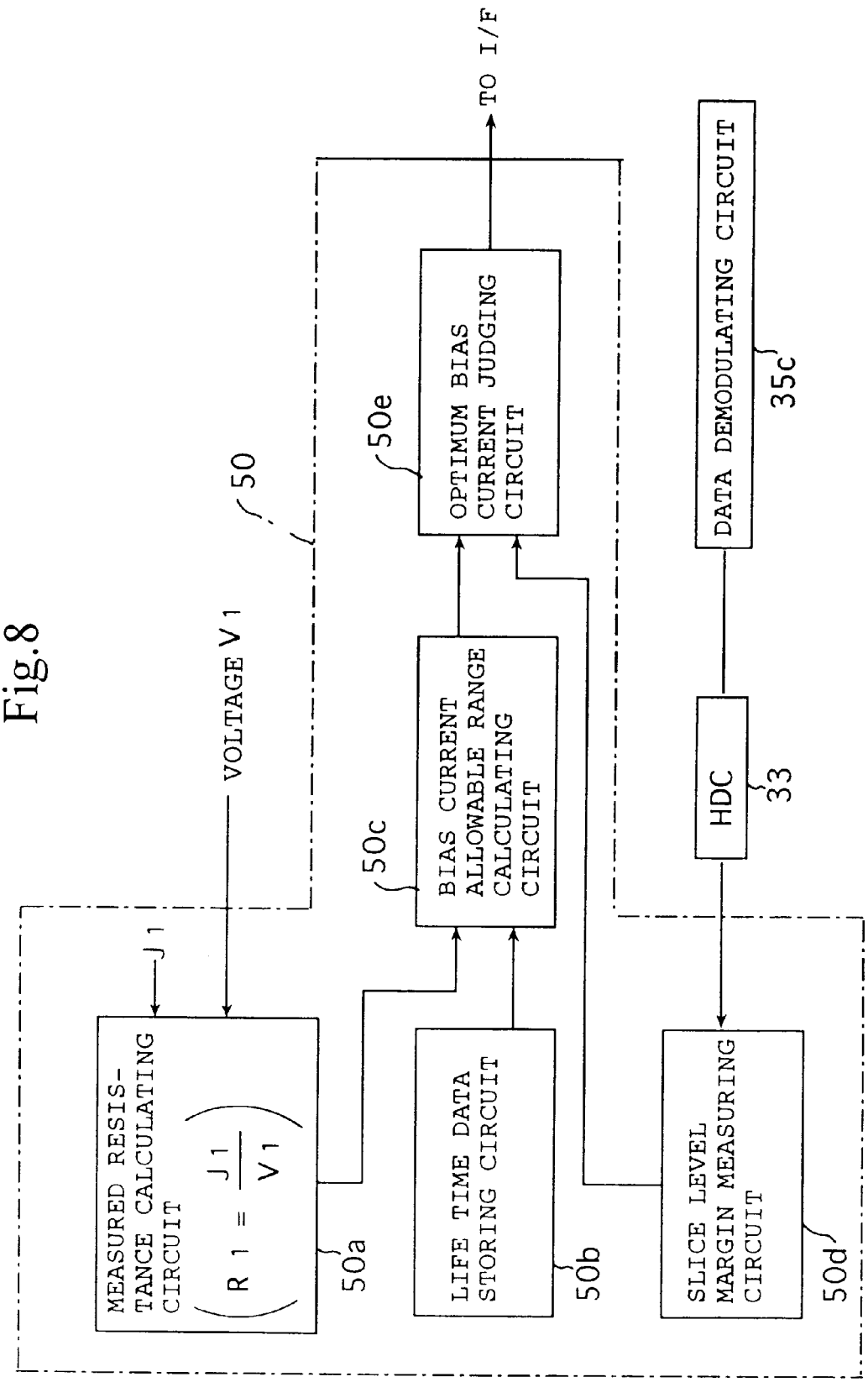
FIG. 8 is a block diagram of a circuit system used to determine the optimum bias current of the MR head of the magnetic disk apparatus according to the embodiment of the present invention.

In addition, as shown in FIG. 8, the MR head resistance R1 is calculated for each MR head 10 according to the Ohm's low (R1=V1/J1) in a measured resistance calculating circuit 50a of the host system 50 by using the data of the bias current J1.

As shown in FIG. 3(A), a core width W between each pair of portions of the leads 10e of the MR head 10 opposite to each other is almost uniform along a direction perpendicular to a flowing direction of the sense current J, and a resistance value of each layer of a sense region Rs placed between the pair of leads 10e in the MR head 10 is inversely proportional to an MR height h of each layer of the sense region Rs. Therefore, the MR height h of each layer in the MR head 10 can be calculated by calculating the resistance value of each layer in the MR head 10 in the host system 50. An electrical resistivity per unit area in each of the layers 10a to 10c shown in FIGS. 3(A) and 3(B) is determined according to a material of each layer and a film thickness of each layer. An MR resistance $r_0$ is obtained according to a following equation.

$$r_0 = (D * \eta / (h * t)) + B$$

Here, the symbol D denotes a core width of the MR head, a symbol $\eta$ denotes a specific resistance of the magneto-resistive effect layer 10c or the like, a symbol h denotes the height of the MR head, a symbol t denotes a film thickness of the magneto-resistive effect layer 10c or the like, and a symbol B denotes a constant value.

Figure 9:
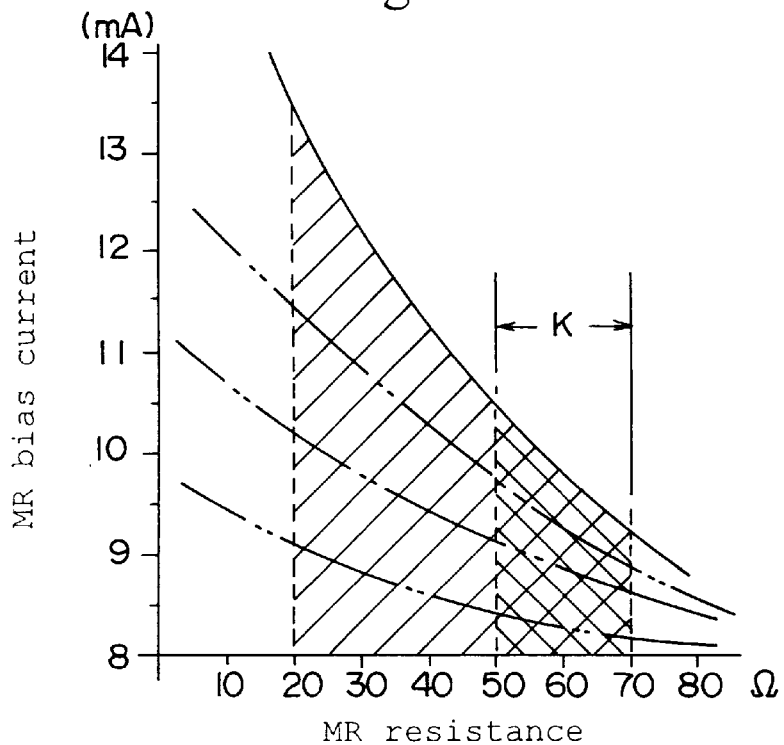
FIG. 9 shows a curved line of a life time of the MR head expressed in rectangular co-ordinates of an MR bias current and an MR resistance.

Thereafter, as shown in FIG. 8, an adjustable range of the bias current is calculated for each MR head 10 in a bias current allowable range calculating circuit 50c according to life time data stored in a life time data storing circuit 50b of the host system 50 and the MR head resistance R1 calculated in the measured resistance calculating circuit 50*a* of the host system 50. As shown in FIG. 9, a curved line of the life time is indicated as a relationship between the MR resistance $r_0$ and the MR bias current, and the adjustable range of the bias current is indicated by an oblique line region which ranges from a minimum MR resistance of 20Ω to a maximum MR resistance of 70Ω and is placed between the curved line of the life time and an MR resistance axis (the MR bias current is zero). This process, in which the bias current is set, the resistance measuring voltages V1 is detected, the MR head resistance R1 is calculated and the MR height h is calculated, is performed for each MR head 10. In this case, the curved line of the life time is determined according to measured data, and a life time calculating method is described later in detail.

After the calculation of the MR resistance and the selection of the MR bias current are performed for each MR head 10, each MR head 10 is sought to correct a core shift for each MR head 10. The core shift is defined as a difference in a track width direction between a center of the MR head 10 and a center of the induction type head When the core shift is performed, a slice level margin or an offset margin is simultaneously measured.

The offset margin indicates width toward the track with at which magnetic data recorded in the MR head 10 is reproducible when the MR head 10 is sought from a center of a track of the magnetic disk 8 in a diameter direction of the magnetic disk 8.

After the magnetic head 10 is sought and magnetic data recorded in the magnetic disk 8 is read out, a change of an output voltage of the MR head 10 is examined. That is, a change of the MR resistance is examined. In this case, because a strength of the bias magnetic field Hb changes with a value of the bias current J, a direction of the magnetization M1 of the magneto-resistive effect layer 10*c* changes with the bias magnetic field Hb. In cases where a strength of the bias magnetic field Hb increases, a line of the bias magnetic field Hb shown in FIG. 4 shifts in the right direction, so that a changing degree of the electrical resistivity changing with an external magnetic field is changed.

The slice level margin is the no error margin of the decision of "0" or "1" by the PR4ML, and is decided as follows.

First, the axis through the center of the least upper bound and the greatest lower bound of the producing voltage wave form is defined as the home position of the standard level of the decision of "0" or "1". And, the standard level is sliced to the least upper bound from the home position and is sliced to the greatest lower bound from the home position as deciding to "0" or "1". The ratio of the slice margin(A) of the standard level with no error to decide "0" or "1" to the difference(B) from the least upper bound to the greater lower bound is the slice level margin (A/B×100%).

Figure 10:
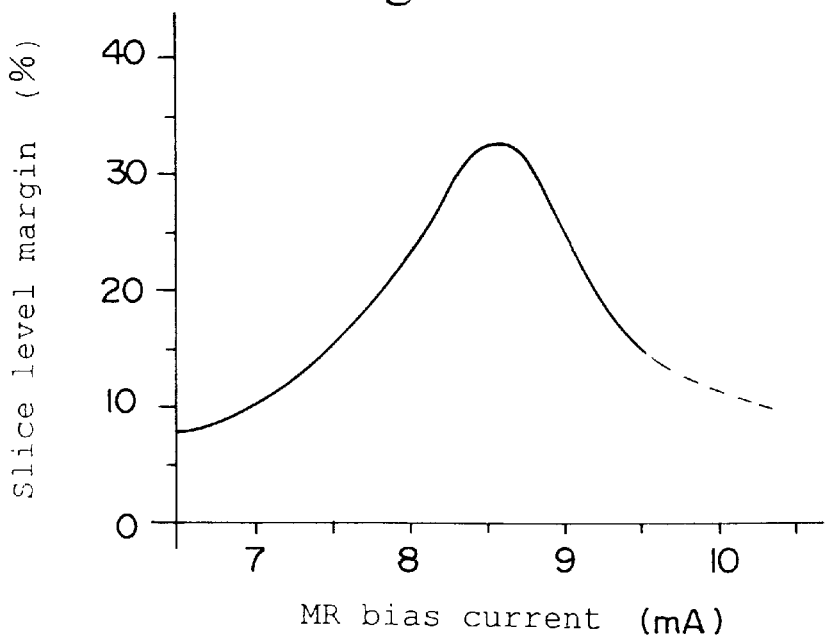
FIG. 10 shows a measured result of a relationship between a slice level margin and an MR bias current in the magnetic disk apparatus according to the embodiment of the present invention.

Thereafter, a particular bias current J at which the slice level margin is maximized is examined in a slice level margin measuring circuit 50*d* of the host system 50. For example, the bias current flowing through the MR head 10 is changed in a range from 6.5 mA to 9.5 mA, and a slice level margin is measured for each value of the bias current. Therefore, as shown in FIG. 10, a relationship between the slice level margin and the bias current is obtained. As is apparent in FIG. 10, the slice level margin has a peak value. The existence of the peak value in the slice level margin is apparent because a peak exists in an amplitude of a waveform of a resistance change (or an output) obtained when a strength of the bias magnetic field Hb depending on the bias current is increased from zero (refer to FIG. 4). Therefore, a particular value of the bias current J at which the slice level margin shown in FIG. 10 is maximized is selected in the adjustable range of the bias current shown in FIG. 9. The particular value of the bias current J is called an optimum value of the bias current (or an optimum bias current). For example, in cases where the MR resistance is 70 λ and the relationship shown in FIG. 10 is obtained, the optimum bias current is about 8.5 mA.

In this embodiment, it is preferred that the bias current is set to each of a large number of values for each MR head 10 on condition that the bias current is set in the oblique line region. That is, as the number of measuring points for the bias current is increased, the relationship between the slice level margin and the bias current can be obtained more accurately. However, it takes a long time to measure the slice level margin. To shorten the measuring time, three measuring current curves shown by three double-dot-dash-lines in FIG. 9 are determined, three values of the bias current are determined for each measuring current curve, a slice level margin is measured for each value of the bias current, and a particular value of the slice level margin which is highest among values of the measured slice level margins is determined as an optimum value of the slice level margin (or an optimum slice level margin).

The measurement of the slice level margin is performed under the control of the host system 50, and a particular value of the bias current J at which the slice level margin is maximized in an allowable range of the bias current obtained according to the curved line of the life time stored in the life time data storing circuit 50*b* is determined as an optimum bias current in an optimum bias current judging circuit 50*e* of the host system 50.

The determination of the optimum value of the bias current (or the optimum bias current) is performed for each of all MR heads 10. Thereafter, as shown in FIG. 11(A), data of the optimum bias currents for the MR heads 10 are output from the host system 50 to the induction type head 11 through the interface 32, the hard disk controller 33 and the data modulating circuit 35*b*. Thereafter, the data of each optimum bias current is transformed into a magnetic field having a particular strength and is written in a data region of the magnetic disk 8. As another case, it is applicable that the data of each optimum bias current be stored in the program memory 38 formed of a semiconductor storing device or a ROM of the micro-controller unit 36.

As is shown in a flow chart of FIG. 6, in case of a writing operation for writing the data of each optimum bias current in the magnetic disk 8, an offset margin of an inner cylinder is measured, a degree of the head core shift is calculated, the tuning of a writing parameter and the tuning of a reading parameter are performed, and the data of each optimum bias current is written with another parameter in the magnetic disk 8.

The data of each optimum bias current written in the data region of the magnetic disk 8 is, as shown in FIG. 11(B), read out through the MR head 10 and the data demodulating circuit 35*c* when the operation of the magnetic disk apparatus 1 is started. Thereafter, the data of each optimum bias current is stored in the buffer memory 34 through the hard disk controller 33. Thereafter, the data of each optimum bias current is transmitted to the bias current control circuit 21*b* through the digital analog converting circuit 36*b* according to a program stored in the buffer memory 34 under the control of the hard disk controller 33. Therefore, the optimum bias current is supplied to each MR head 10 under the control of the bias current control circuit 21*b*. In this case, a default (or examining) current written in the program memory 38 in advance is supplied to each MR head 10 as an initial bias current.

Therefore, because the optimum bias current determined for each MR head 10 is supplied to each MR head 10, the performance of each MR head 10 can be sufficiently used, and the degradation of the MR head 10 caused by its migration can be prevented. Also, in cases where the bias currents flowing through all MR heads 10 are the same value, even though a particular MR head 10 is not used for a magnetic disk apparatus in a prior art because the MR resistance of the particular MR head 10 is too high, because the optimum bias current flows though the particular MR head 10, a number of MR heads 10 manufactured in a large scale manufacturing can be efficiently used for a number of magnetic recording apparatuses 1.

The curved line of the life time of the MR head 10 shown in FIG. 9 is determined as follows.

A plurality of MR heads 10 having different MR heights are prepared, an acceleration experiment is performed for each MR head 10 while heating each MR head and supplying a bias current to each MR head, and a life time of each MR head is examined. This examination of the life time is repeated while changing a value of the bias current supplied to each MR head.

Figure 12A:
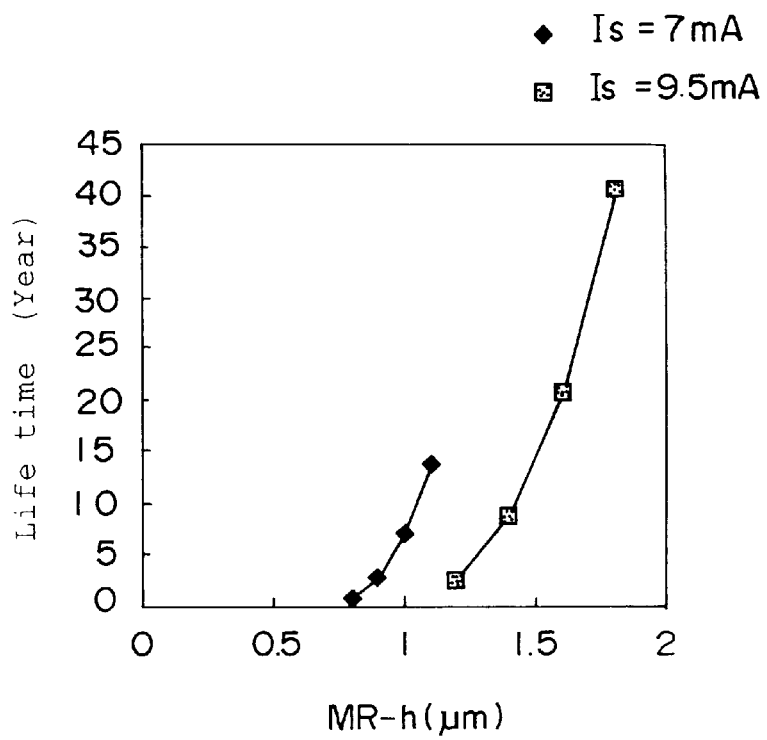
FIGS. 12(A) and 12(B) respectively show a relationship between a height of the MR head and a life time of the MR head applied for the magnetic disk apparatus according to the embodiment of the present invention.
Figure 12B:
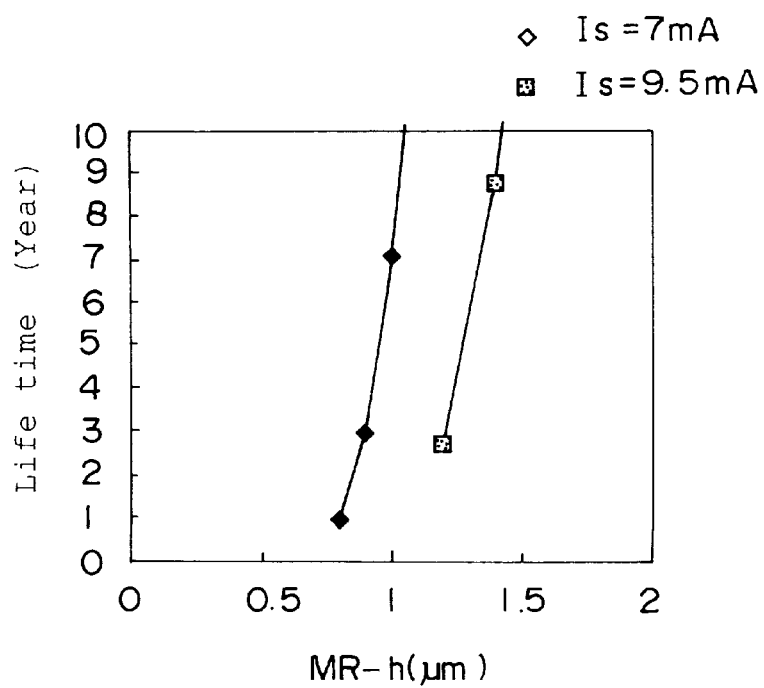

Therefore, as shown in FIGS. 12(A) and 12(B), a plurality of curved lines can be obtained. Thereafter, a particular life time desired (or examined) by an operator is determined, and a curved line indicating a relationship between the bias current and the MR height h in the particular life time is determined. In this case, because the MR height is inversely proportional to the MR head resistance, another relationship between the bias current and the MR resistance is shown in FIG. 9 in place of the relationship between the bias current and the MR height h. Accordingly, the curved line of the life time changes with a value of the particular life time desired by the operator.

The life time $\tau$ of the MR head 10 is determined according to a following equation.

$$\tau = A * j^{-2} * \exp(9700/T) \quad j=J/(h*t)$$

Here, the symbol A denotes a constant value, the symbol T denotes a temperature, the symbol J denotes the sense current, the symbol j denotes a current density, the symbol h denotes the MR height, and the symbol t denotes a film thickness of the magneto-resistive effect layer 10c or the like.

Accordingly, because an allowable range for a value of the bias current is determined according to the relationship between the resistance of the MR head 10 and the life time of the MR head 10 and the optimum bias current is set within the allowable range, an output power of a signal output from the MR head 10 having a low resistance can be increased.

Also, because a particular value of the bias current at which the slice level margin is maximized is set as the optimum bias current within the allowable range for each MR head 10, the performance of each MR head 10 can be sufficiently used, and the degradation of each MR head 10 caused by its migration can be prevented.

Also, in cases where the bias currents flowing through all MR heads 10 are the same value, even though a particular MR head 10 is not used for a magnetic disk apparatus in a prior art because the MR resistance of the particular MR head 10 is too high, because the optimum bias current flows though the particular MR head 10, a number of MR heads 10 manufactured in a large scale manufacturing can be efficiently used for a number of magnetic recording apparatuses 1.

Figure 13:
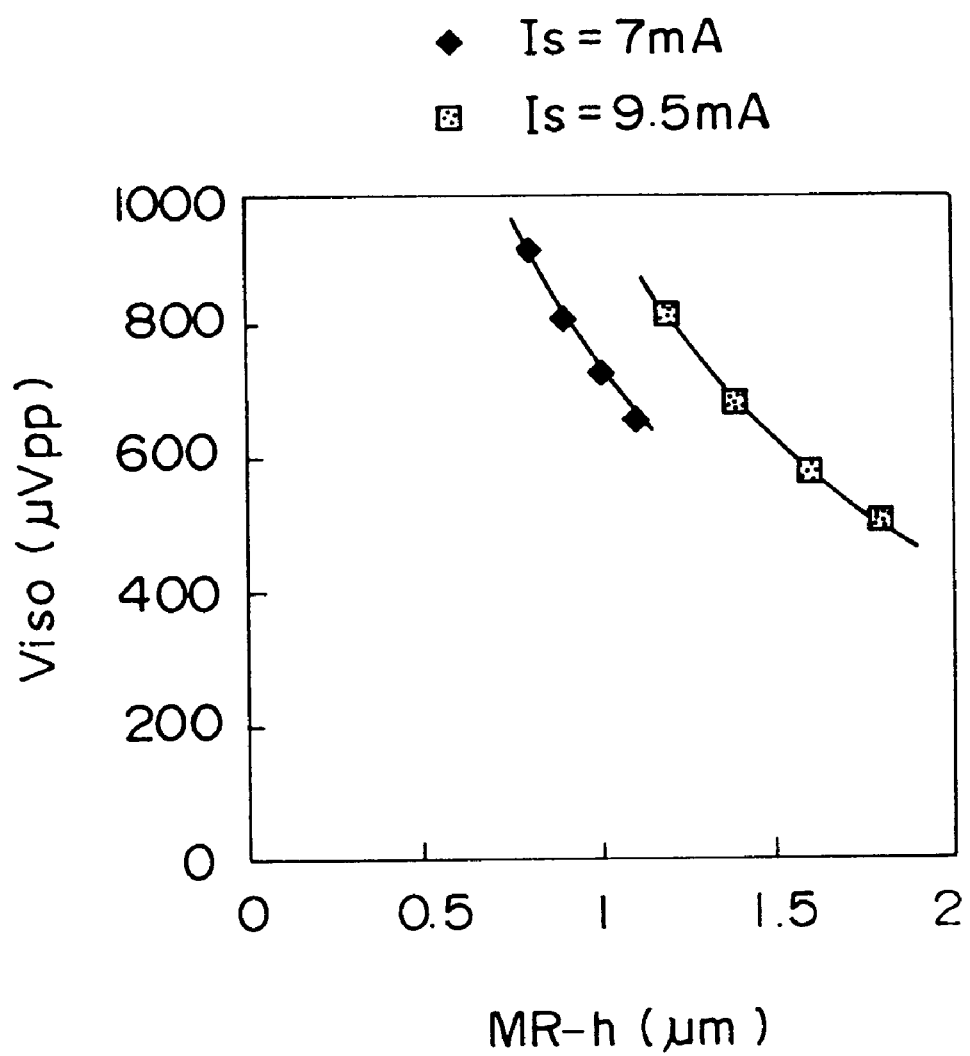
FIG. 13 shows a relationship between an output voltage of the MR head and a life time of the MR head applied for the magnetic disk apparatus according to the embodiment of the present invention.
Figure 14A:
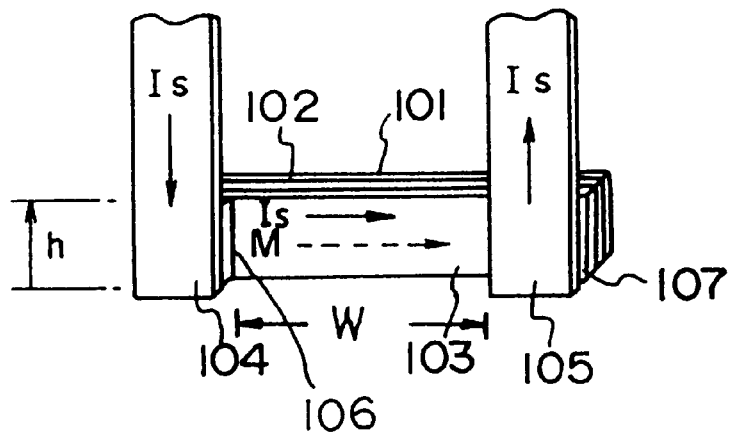
FIG. 14(A) is a diagonal view showing a magnetic layer of an MR head.
Figure 14B:
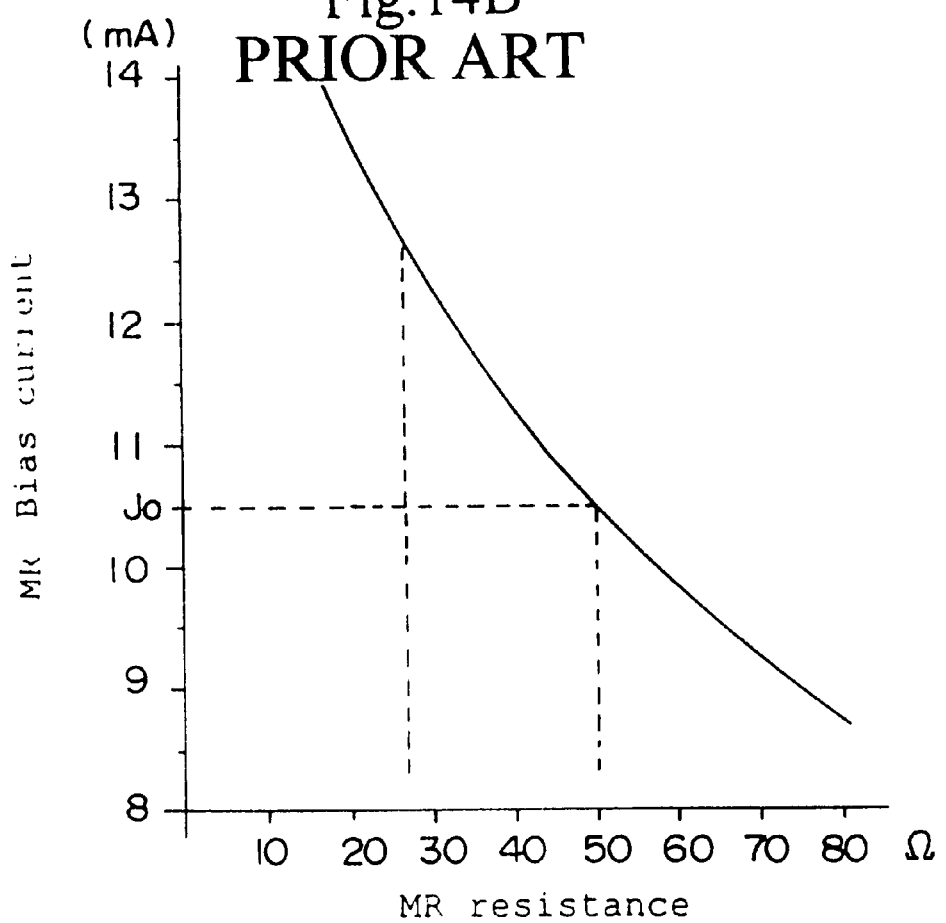
FIG. 14(B) shows a relationship among a bias current in the MR head, a resistance of the MR head and a life time of the MR head.
Figure 15:
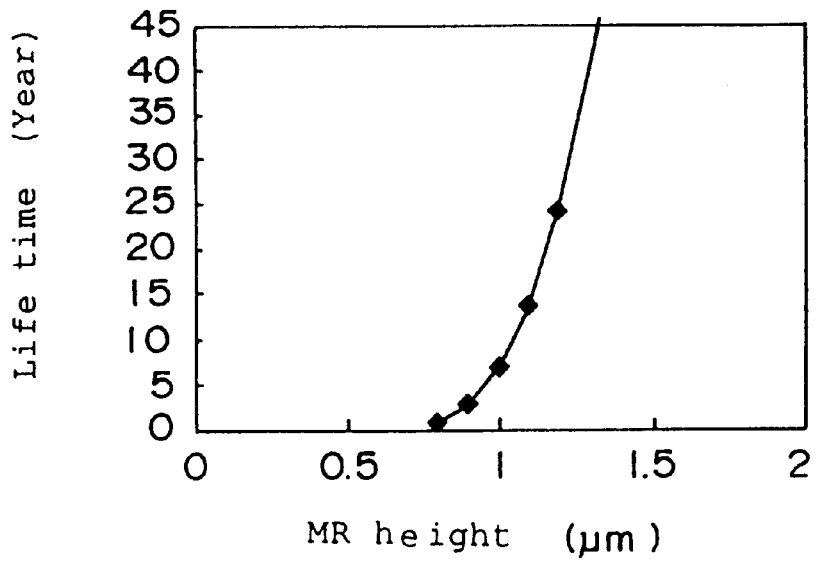
FIG. 15 shows an example of a life time curved line used to determine an MR height of a conventional MR head.
Figure 16:
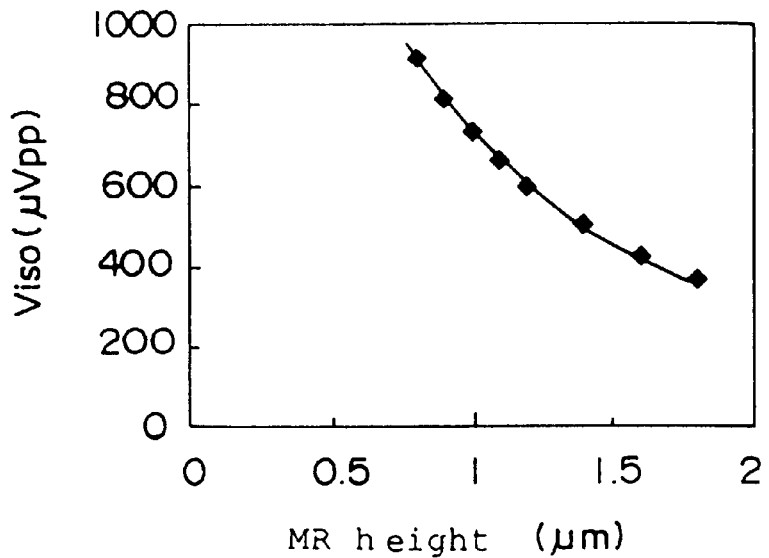
FIG. 16 shows an example of an output curved line used to determine an MR height of a conventional MR head.

In this embodiment, a value of the optimum bias current for each MR head 10 is determined according to the curved line of the life time of the MR head 10 and the characteristic curved line of the slice level margin. However, as shown in FIG. 13, it is applicable that a value of the optimum bias current for each MR head 10 be determined according to a relationship between an output voltage Viso and the MR height h. For example, to set a plurality of output voltages Viso of a plurality of MR heads 10 in a prescribed range, it is applicable that a bias current for each MR head 10 be selected as an optimum bias current on condition that an output voltage Viso corresponding to the bias current is set in the prescribed range.

In this embodiment, the magnetic recording apparatus is represented by the magnetic disk apparatus 1 for which the MR head is applied. However, it is applicable that the magnetic recording apparatus be represented by a magnetic tape recording apparatus for which a reproducing head is applied. In this case, an optimum bias current is determined for each reproducing head.

What is claimed is:

1. A method for adjusting a bias current flowing through a magneto-resistive effect type magnetic head, comprising the steps of:

supplying an examining current to the magneto-resistive effect type magnetic head;

measuring a voltage applied to a pair of terminals of the magneto-resistive effect type magnetic head through which the examining current flows;

calculating a resistance of the magneto-resistive effect type magnetic head according to the examining current and the voltage;

calculating an allowable range of a magneto-resistive effect type bias current flowing through the magneto-resistive effect type magnetic head according to a relationship between the resistance and a life time of the magneto-resistive effect type magnetic head determined in advance; and determining an optimum value of the magneto-resistive effect type bias current as an optimum magneto-resistive effect type bias current within the allowable range.

2. A method for adjusting a bias current flowing through a magneto-resistive effect type magnetic head, according to claim 1, wherein the step of determining an optimum value of the magneto-resistive effect type bias current includes steps of:

determining a particular value of the magneto-resistive effect type bias current at which a slice level margin indicating an amplitude of an output voltage of the magneto-resistive effect type magnetic head is maximized; and setting particular value of the magneto-resistive effect type bias current as the optimum magneto-resistive effect type bias current.

3. A magnetic recording apparatus according to claim 2, comprising:

bias current supplying means for outputting an optimum magneto-resistive effect type bias determined according to a method for adjusting a bias current flowing through a magneto-resistive effect type magnetic head;

a magneto-resistive effect type magnetic head to which the optimum magneto-resistive effect type bias current is supplied from the bias current supplying means; and a magnetic recording medium arranged in a position opposite to the magneto-resistive effect type magnetic head.

4. A method for adjusting a bias current flowing through a magneto-resistive effect type magnetic head, according to claim 3, wherein the recording means is a magnetic recording medium.

5. A magnetic recording apparatus according to claim 4, comprising:

bias current supplying means for outputting an optimum magneto-resistive effect type bias current determined according to a method for adjusting a bias current flowing through a magneto-resistive effect type magnetic head;

a magneto-resistive effect type magnetic head to which the optimum magneto-resistive effect type bias current is supplied from the bias current supplying means; and a magnetic recording medium arranged in a position opposite to the magneto-resistive effect type magnetic head.

6. A magnetic recording apparatus, comprising:

bias current supplying means for outputting an optimum magneto-resistive effect type bias current determined according to a method for adjusting a bias current flowing through a magneto-resistive effect type magnetic head, written in one of the claims 1 to 5;

a magneto-resistive effect type magnetic head to which the optimum magneto-resistive effect type bias current is supplied from the bias current supplying means; and a magnetic recording medium arranged in a position opposite to the magneto-resistive effect type magnetic head.

7. A magnetic recording apparatus according to claim 6, comprising:

bias current supplying means for outputting an optimum magneto-resistive effect type bias current determined according to a method for adjusting a bias current flowing through a magneto-resistive effect type magnetic head;

a magneto-resistive effect type magnetic head to which the optimum magneto-resistive effect type bias current is supplied form the bias current supplying means; and a magnetic recording medium arranged in a position opposite to the magneto-resistive effect type magnetic head.

8. An apparatus for adjusting a bias current flowing through a magneto-resistive effect type magnetic head, according to claim 7, further comprising:

bias current supplying means for supplying the optimum bias current to the magneto-resistive effect type magnetic head according to the data of the optimum bias current stored in the optimum bias current storing means under the control of the current control means.

9. A magnetic recording apparatus according to claim 8, comprising:

bias current supplying means for outputting an optimum magneto-resistive effect type bias current determined according to a method for adjusting a bias current flowing through a magneto-resistive effect type magnetic head;

a magneto-resistive effect type magnetic head to which the optimum magneto-resistive effect type bias current is supplied form the bias current supplying means; and a magnetic recording medium arranged in a position opposite to the magneto-resistive effect type magnetic head.

* * * * *

UNITED STATES PATENT AND TRADEMARK OFFICE
CERTIFICATE OF CORRECTION

PATENT NO. : 6,067,200
DATED : May 23, 2000
INVENTOR(S) : Ohba et al.

It is certified that error appears in the above-identified patent and that said Letters Patent is hereby corrected as shown below:

Column 13, line 3, please delete "claim 3" and insert --claim 10-- therefor.

Column 13, line 18, after "apparatus", please insert --according to claim 1--.

Column 13, line 23, please delete "head, written in one of the claims 1 to 5" and insert --head;-- therefor.

Column 13, line 30, please delete "claim 6" and insert --claim 10-- therefor.

UNITED STATES PATENT AND TRADEMARK OFFICE
CERTIFICATE OF CORRECTION

PATENT NO. : 6,067,200
DATED : May 23, 2000
INVENTOR(S) : Ohba et al.

It is certified that error appears in the above-identified patent and that said Letters Patent is hereby corrected as shown below:

Column 14, line 12, please delete "claim 7" and insert --claim 12-- therefor.

Column 14, line 18, please delete "claim 8" and insert --claim 1-- therefor.

Please insert Claim 10:

--10. A method for adjusting a bias current flowing through a magneto-resistive effect type magnetic head, according to claim 1, further comprising a step of storing data of the optimum magneto-resistive effect type bias current in a recording means.--

UNITED STATES PATENT AND TRADEMARK OFFICE
CERTIFICATE OF CORRECTION

PATENT NO. : 6,067,200
DATED : May 23, 2000
INVENTOR(S) : Ohba et al.

It is certified that error appears in the above-identified patent and that said Letters Patent is hereby corrected as shown below:

Please insert Claim 11:

--11. A method for adjusting a bias current flowing through a magneto-resistive effect type magnetic head, according to Claim 10, wherein the recording means is a semiconductor recording device.--

Please insert Claim 12:

--12. An apparatus for adjusting a bias current flowing through a magneto-resistive effect type magnetic head, comprising:

current control means controlling the bias current supplied to the

UNITED STATES PATENT AND TRADEMARK OFFICE
CERTIFICATE OF CORRECTION

PATENT NO. : 6,067,200
DATED : May 23, 2000
INVENTOR(S) : Ohba et al.

It is certified that error appears in the above-indentified patent and that said Letters Patent is hereby corrected as shown below:

magneto-resistive effect type magnetic head;

voltage detecting means for detecting a voltage applied to both ends of the magneto-resistive effect type magnetic head to which the bias current is supplied under the control of the current control means;

resistance value calculating means for calculating a resistance of the magneto-resistive effect type magnetic head according to data of the voltage detected by the voltage detecting means and data of the bias current supplied to the magneto-resistive effect type magnetic head under the control of the current control means;

life time data storing means for storing life time data indicating a relationship among the resistance of the magneto-resistive effect type magnetic head calculated by the resistance value calculating means, the

UNITED STATES PATENT AND TRADEMARK OFFICE
CERTIFICATE OF CORRECTION

PATENT NO. : 6,067,200
DATED : May 23, 2000
INVENTOR(S) : Ohba et al.

It is certified that error appears in the above-indentified patent and that said Letters Patent is hereby corrected as shown below:

bias current supplied to the magneto-resistive effect type magnetic head under the control of the current control means and a life time of the magneto-resistive effect type magnetic head;

bias current allowable range setting means for setting an allowable range of the bias current supplied to the magneto-resistive effect type magnetic head under the control of the current control means according to the resistance of the magneto-resistive effect type magnetic head calculated by the resistance value calculating means and the life time data stored in the life time data storing means;

optimum bias current determining means for determining an optimum value of the bias current supplied to the magneto-resistive effect type magnetic head under the control of the current control

UNITED STATES PATENT AND TRADEMARK OFFICE
CERTIFICATE OF CORRECTION

PATENT NO. : 6,067,200
DATED : May 23, 2000
INVENTOR(S) : Ohba et al.

It is certified that error appears in the above-identified patent and that said Letters Patent is hereby corrected as shown below:

means as an optimum bias current within the allowable range setting means; and optimum bias current storing means for storing data of the optimum bias current determined by the optimum bias current determining means.--

Please insert Claim 13:

--13. An apparatus for adjusting a bias current flowing through a magneto-resistive effect type magnetic head, according to Claim 12, further comprising:

UNITED STATES PATENT AND TRADEMARK OFFICE
CERTIFICATE OF CORRECTION

Page 7 of 7

PATENT NO. : 6,067,200
DATED : May 23, 2000
INVENTOR(S) : Ohba et al.

It is certified that error appears in the above-identified patent and that said Letters Patent is hereby corrected as shown below:

slice level margin with respect to a width of a track of a magnetic recording medium, information being written in the magnetic recording medium through the magneto-resistive effect type magnetic head and being read out from the magnetic recording medium through the magneto-resistive effect type magnetic head, wherein the optimum bias current is determined by the optimum bias current determining means within the allowable range of the bias current on condition that the slice level margin is maximized --

Signed and Sealed this

Twenty-second Day of May, 2001

*Attest:*

NICHOLAS P. GODICI

*Attesting Officer*  Acting Director of the United States Patent and Trademark Office